(12) United States Patent
Sharp

(10) Patent No.: US 11,066,971 B1
(45) Date of Patent: Jul. 20, 2021

(54) TRANSPORTABLE GENSET EMISSIONS REDUCTION SYSTEM

(71) Applicant: Robert J Sharp, Camarillo, CA (US)

(72) Inventor: Robert J Sharp, Camarillo, CA (US)

(*) Notice: Subject to any disclaimer, the term of this patent is extended or adjusted under 35 U.S.C. 154(b) by 154 days.

(21) Appl. No.: 16/200,000

(22) Filed: Nov. 26, 2018

Related U.S. Application Data

(60) Provisional application No. 62/590,637, filed on Nov. 26, 2017.

(51) Int. Cl.
*F01N 3/00* (2006.01)
*F01N 3/021* (2006.01)
*F02B 63/04* (2006.01)

(52) U.S. Cl.
CPC ........... *F01N 3/021* (2013.01); *F02B 63/042* (2013.01); *F02B 63/047* (2013.01)

(58) Field of Classification Search
None
See application file for complete search history.

(56) References Cited

U.S. PATENT DOCUMENTS

| | | | |
|---|---|---|---|
| 8,721,771 B2* | 5/2014 | Duesel, Jr. ............ | B01D 45/08 95/272 |
| 2011/0265449 A1* | 11/2011 | Powell .................... | F23J 11/00 60/272 |
| 2012/0141351 A1* | 6/2012 | Denzer .............. | B01D 53/8668 423/400 |
| 2017/0342883 A1* | 11/2017 | Tonsich ................ | B01D 53/62 |

OTHER PUBLICATIONS

Article titled "A Brief Overview of Ship's Auxiliary Engine" by Raunek Kantharia and published in Aug. 2016.*

* cited by examiner

*Primary Examiner* — Blake A Tankersley

(57) ABSTRACT

Given that power blackouts occur very infrequently, a TRANSportable GENset emissions reduction system (XGEN) that fixes a larger and more significant problem of reducing emissions from routine periodic testing of backup gensets, whereas the system may be scheduled to be shared by a multitude of gensets, thereby reducing costs through efficient use of capital expenditures while also increasing the quality of emissions reductions as compared to applying individual exhaust treatments each backup genset.

15 Claims, 5 Drawing Sheets

TRANSPORTABLE GENSET EMISSIONS REDUCTION SYSTEM

CROSS-REFERENCE TO RELATED APPLICATIONS

This application claims the benefit of PPA Ser. No. 62/590,637, filed 2017 Nov. 26 by the present inventor, which is incorporated by reference.

FEDERALLY SPONSORED RESEARCH

None.

SEQUENCE LISTING

None.

BACKGROUND

Many businesses require at least one backup genset to provide electrical power when the electrical utility fails. Most of these backup gensets use diesel fuel. Backup gensets only operate during periodic testing and during blackouts. However, many local communities are becoming increasingly annoyed when these diesel gensets operate because they produce harmful air contaminants and noise. These harmful air contaminants include, among others, particulate matter (PM) and oxides of nitrogen ($NO_x$). Most of the older diesel gensets either have no emissions treatment system installed. Most relatively new diesel gensets have insufficient emissions treatment systems installed. Many diesel gensets produce a very noticeable black plume, especially in the first minutes after startup. Although regulators have been tightening emission regulations for new installations, the pre-existing gensets continue to pollute.

Backup gensets, also known as standby generators or standby gensets or emergency power systems, are intended to be used during electrical utility blackouts only. However, backup gensets still need to be started periodically every few weeks to test them to check if they are operational and to keep their engines in good operating condition. However, affected local communities are becoming increasingly intolerant of diesel emissions due to increasing evidence that diesel emissions can cause cancer and other health problems. Even a limited amount of diesel emissions during periodic testing can cause significant concern to those living in nearby communities, especially when there is a high concentration of backup gensets in locations such as datacenters. Power blackouts infrequently occur in the developed world, so the larger and more significant problem is the routine periodic cold startups of backup gensets.

Gensets are classified as either prime power and backup power. Prime power gensets are used as the primary source of power. Examples of prime power gensets are used in oceangoing vessels (OGV's), power plants, or remote locations where grid power is not available. Backup power gensets are used in locations where electrical power is normally available from the utility or electrical grid, but when the utility or electrical grid temporarily fails to supply power, the backup genset(s) take over. The emissions from prime power gensets are continuous, while emissions from backup gensets are periodic.

Air pollution regulators classify emissions sources classified as either stationary or mobile. Examples of mobile sources include automobiles, trucks, locomotives, and oceangoing vessels (OGV's). Mobile equipment can be moved via roads or waterways. Examples of stationary sources include backup gensets, power plants, refineries, and industrial facilities. In California, mobile emissions sources are typically regulated by the Environmental Protection Agency (EPA) and/or the California Air Resources Board (CARB), while stationary sources are regulated by local districts, such as the South Coast Air Quality Management District (AQMD). The reason for this is that mobile sources move between geographic regions and therefore must be regulated by institutions that cover a broader geographic region than the local districts. Thus, backup gensets are considered stationary sources and gensets on oceangoing vessels (OGV's) are considered mobile sources.

The most significant pollutants from diesel engines are particulate matter (PM), oxides of nitrogen ($NO_x$), oxides of sulfur ($SO_x$), and carbon dioxide ($CO_2$).

Particulate Matter (PM), commonly known as "soot," is the most important pollutant due to its dangerous health effects to the local population. PM is produced by the incomplete combustion of fuel. PM is especially visible as the "black cloud" that can be seen for miles when a genset is started. It is a major element of soot, which is one of the deadliest forms of widespread air pollution. PM is linked to heart attacks and strokes, cancer, developmental effects in children, and premature death. PM in the form of black carbon is the second-largest greenhouse gas after carbon dioxide. Black carbon leads to decreased agricultural productivity because it influences the formation of clouds and disrupts participation patterns, and it rapidly increases the rate of ice melt in the Arctic. Removing one ton of diesel black carbon from the atmosphere, for example, is equivalent to removing roughly 3,200 tons of carbon dioxide pollution. Black carbon is considered a "super pollutant" or as-as otherwise known as a short-lived climate pollutant (SLCP).

Most existing gensets have the disadvantage of not having any PM control. Recently, however, diesel engine manufacturers have been installing PM filters called diesel particulate filters (DPF's) to control PM. The typical DPF is made of a ceramic substrate that directly filters the particles. The PM trapped by the DPF is composed of soot (Elemental Carbon (EC), Organic Carbon (OC), absorbed hydrocarbons, and inorganic compounds (metallic abrasion particles, sulfates, and silicates). The mass of the inorganic fraction, however, is very small compared to the organic fraction, especially when ultra-low-sulfur (0.0015%) fuel is used.

DPF's need to be regenerated periodically or they clog up, which can lead to a system shutdown. The DPF regeneration process "completes the combustion" of the organic fraction, converting PM to $CO_2$ and water. The inorganic fraction, however, cannot be regenerated, and this small amount of ash is removed periodically. A "regeneration cycle" is needed periodically, especially if 1) the engine experiences many startups compared to the overall operating time, or 2) the engine runs at a low power level or runs unloaded. The disadvantage of the backup gensets with DPF's is they are frequently exposed to the above conditions (i.e., frequent startups and running at low loads), increasing the likelihood that the DPF will need to be disassembled to remove the ceramic substrate for chemical treatment or a high-temperature bake.

Regeneration can be active or passive. An active regeneration applies additional heat to raise the temperature of the exhaust gas above the minimum regeneration temperature. A passive regeneration cycle does not use external heat but relies on the periodic high-load/high-temperature periods during a normal operating cycle. A passive regeneration typically takes about 2 hours. When operating cycles include more cold starts and idling periods (as is the case for backup gensets), then passive regeneration may not be effective unless special precaution is taken to make sure the generator runs at high loads for extended periods of time.

$NO_x$ (NO and $NO_2$) is produced during combustion at high temperatures. In diesel exhaust, most of the nitrogen oxide is in the form of NO. $NO_2$ is produced in much lower concentrations. An average diesel engine produces 500 to 900 ppm $NO_x$. NO, and particularly $NO_2$ can damage the lungs, heart, liver, and kidneys. $NO_x$ combines with other substances and creates smog when exposed to sunlight. $NO_x$ combines with water which produces nitric acid, which is a cause of acid rain. $NO_x$ is also a greenhouse gas.

Most existing gensets have the disadvantage of not having any $NO_x$ control at all. Recently, however, diesel engine manufacturers have been installing selective catalytic reduction (SCR) for removing $NO_x$ from the exhaust gas. The catalysts used in SCR's must reach a certain temperature to work efficiently during the startup phase, so $NO_x$ is not sufficiently controlled during cold starts when backup gensets are tested every few weeks. Thus, even newer backup gensets that include SCR's have the disadvantage of insufficient $NO_x$ control when they are tested frequently.

In diesel exhaust, most of the sulfur oxide is in the form of $SO_2$. A portion of the $SO_2$ will react with the water and form $H_2SO_4$ (sulfuric acid). Fuel quality is directly related to $SO_x$ emissions. The lower the sulfur content in the fuel, the lower the $SO_x$ emissions. $TSO_2$ and $H_2SO_4$ are irritants of the respiratory system, are odorous, contribute to acid rain, and can form fine PM from combination with oxygen (sulfates).

Although $CO_2$ is not classified as a toxic emission and is typically not regulated, $CO_2$ is a greenhouse gas (GHG), which is quickly becoming important worldwide. As noted before, PM is a super pollutant that is roughly 3,200 times as potent as $CO_2$ as a greenhouse gas. Practically no gensets have individual $CO_2$ reduction systems installed.

Gensets also can have the disadvantage of being noisy. Some gensets have mufflers installed, but large gensets still produce a significant amount of noise, even with mufflers installed, which can be annoying to nearby residents.

Retrofitting existing backup gensets with emissions treatments has the disadvantage of being very expensive due to the inefficiency of adding an emissions treatment after the fact as compared to a factory-installed emissions treatment. Furthermore, genset retrofits have the disadvantage of requiring multiple capital expenditures—one for each installed genset. Furthermore, these expensive retrofits have the disadvantage of being only partially effective during routine periodic testing as described above. Thus, costly and ineffective genset retrofits may discourage the installation of emissions treatments, leading to increased PM and $NO_x$ emissions. Furthermore, practically all retrofits have the disadvantage of not reducing $SO_x$ and $CO_2$ emissions.

SUMMARY

In accordance with at least one embodiment a TRANSportable GENset (XGEN) emissions reduction system.

DRAWINGS—FIGURES

The novel features which are characteristic of the present invention are set forth in the appended claims. However, embodiments, together with further objects and attendant advantages, will be best understood by reference to the following detailed description taken in connection with the accompanying drawings in which:

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The details of one or more embodiments of the invention are set forth in the accompanying drawings and the description below. Other features, objects, and advantages of the invention will be apparent from the description and drawings, and from the claims.

Figure 1:
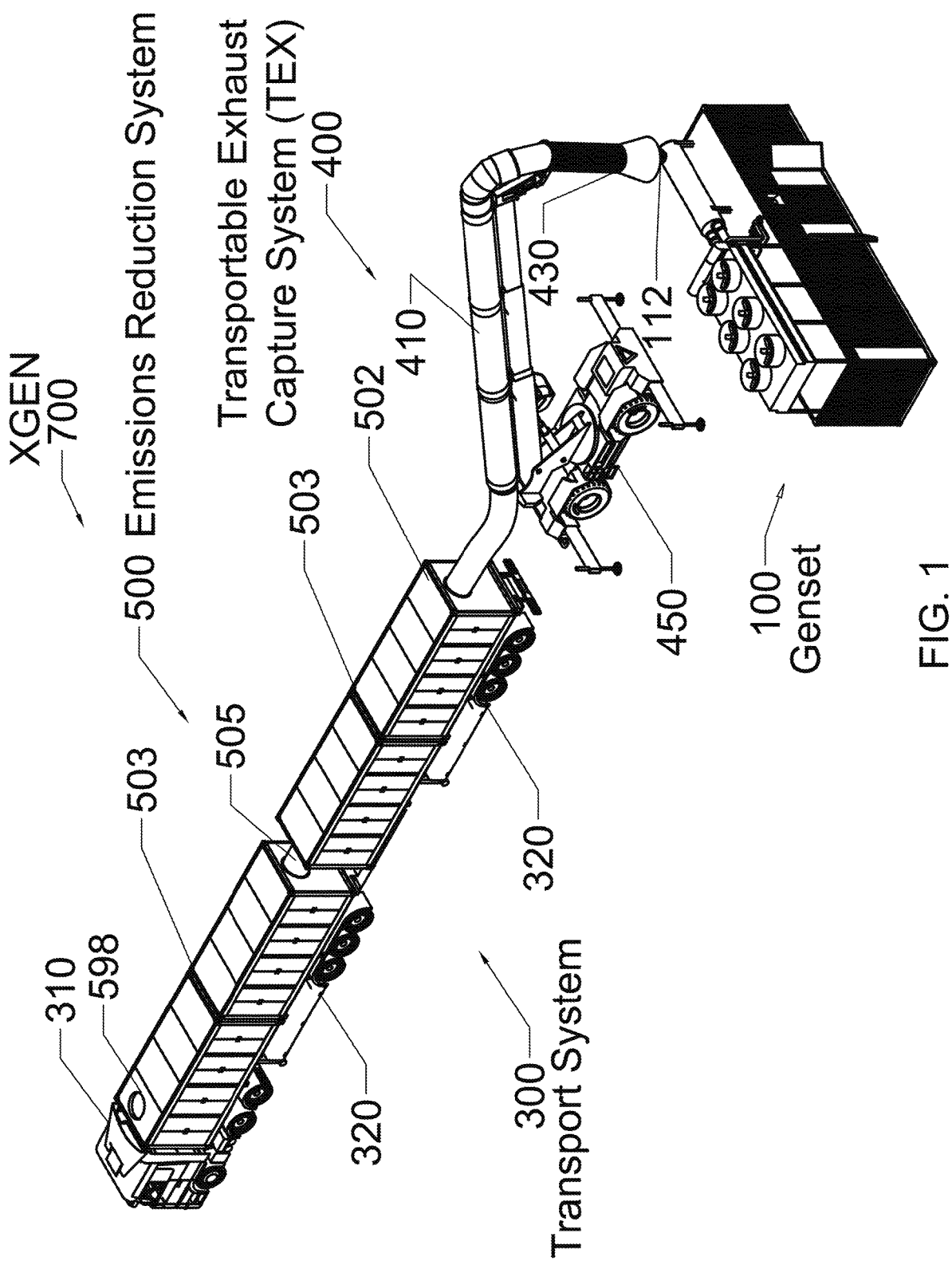
FIG. 1 shows a perspective view of an exemplary embodiment of a TRANSportable GENset emissions reduction system (XGEN) connected to an exemplary genset 100.

FIG. 1 shows an exemplary embodiment of a transportable genset emissions reduction system (XGEN) 700 connected to an exemplary genset 100. XGEN 700 is mobile and therefore transportable from one stationary emissions source to another. A more useful version of XGEN 700 is a road-mobile version that enables XGEN 700 to service multiple emissions sources that are separated by roads. Genset 100 is a typical motor-generator set may be part of an emergency power system (backup generator or standby generator) for homes, hospitals, scientific laboratories, data centers, telecommunication equipment. Genset 100 could also be part of the auxiliary generator system in boats, ships, and oceangoing vessels. Genset 100 may represent either a) a single exhaust pipe on a single genset or b) a plurality of gensets that may culminate into a single shared exhaust pipe.

Emissions from genset 100 exit via exhaust pipe 112. Transportable exhaust capture system 400, also known as TEX, provides a conduit for exhaust gas emitted from exhaust pipe 112 to emissions reduction system inlet 502 via connector 430 and transportable exhaust capture system duct 410. The components of an exemplary embodiment of emissions reduction system 500 are housed in at least one exhaust treatment containers 503. If multiple exhaust treatment containers 503 are used, then they are connected by interconnecting duct 505. Emissions reduction system 500 is mounted on transport system 300 comprising truck 310 and chassis 320.

A disadvantage of prior art emissions control systems is that a single emissions control system can only service one genset (1-to-1 instead of 1-to-many) in the case where only one genset needs to operate at a time. This is because 1) each emissions control system is continuously connected to each genset, 2) an emissions control system is stationary (fixed) and is therefore limited to a single emissions source, and/or 3) an emission control system that is too large to be transported on roads without special permits and cannot connect to additional gensets. One exemplary embodiment is exhaust treatment containers 503 are designed to be the same size and have compatible mounting fittings as commercially-available shipping containers. Furthermore, truck 310 and chassis 320 are commercially available to transport the containers. Therefore, the exemplary embodiment of transport system 300, comprising truck 310, chassis 320, and exhaust treatment containers 503 has the advantage of being road-mobile and compatible with road transportation, thereby allowing XGEN 700 to easily move from genset to genset on ordinary roads and allowing XGEN 700 to be applied to multitude of gensets that may be scheduled to run at different times. The ability to periodically test a multitude of gensets using a pre-determined schedule provides the advantage of efficient use of capital expenditures, thereby significantly improving the cost-effectiveness for reducing pollution within a local geographic area that contains a multitude of gensets. Furthermore, an embodiment of XGEN 700 that conforms to universal transportation standards has the advantage of fast and inexpensive shipment to any location in the world via container trucks, container trains, and container ships, thereby eliminating expensive and time-consuming modifications to a multitude of gensets 100.

An exemplary embodiment of transportable exhaust capture system (TEX) 400 may be any mobile or driving crane known in the art (e.g., Lieber, Manitowoc, Terex, Grove, or Link-Belt) that can be transported/driven on regular roads. Another exemplary embodiment of TEX 400 is a driving telescopic crane with telescopic ducting. Yet another exemplary embodiment of TEX 400 may be articulating or a combination of articulating and telescopic. Yet another exemplary embodiment of TEX 400 articulating mobile cranes may also be converted concrete pumping cranes (e.g., Putzmeister, Schwing, or KCP). Yet another alternative exemplary embodiments of TEX 400 are a manual connection for small, easy-to-reach gensets, and a forklift. Yet another alternative exemplary embodiment is a plurality of fixed or semi-fixed capture systems which connect one at a time to a single transportable emissions reduction system 500. Yet another alternative exemplary embodiment of TEX 400 is connecting to multiple gensets via a single exhaust pipe, thereby eliminating the need to move between connections.

Figure 2:
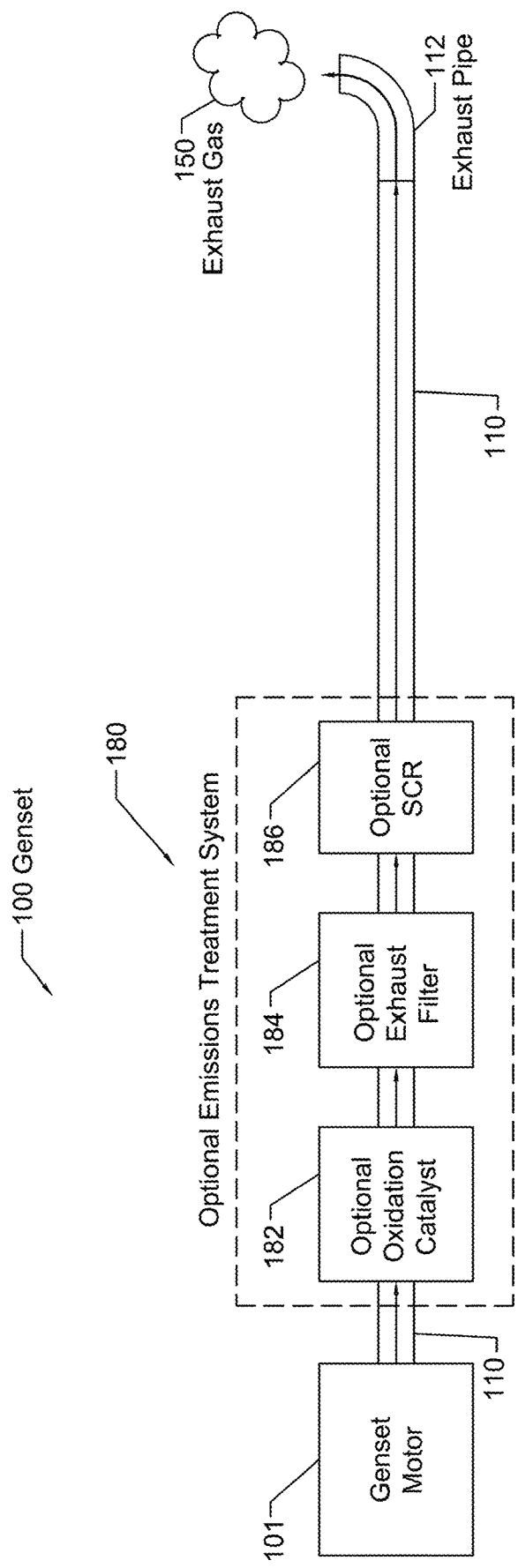
FIG. 2 is a block diagram showing a genset 100 with an optional genset emissions treatment 180 installed.

FIG. 2 shows a typical backup genset 100 connected to an exhaust pipe 112 by exhaust duct 110. If an optional exhaust treatment 180 is used, then optional exhaust treatment 180 is inserted between backup genset 100 and exhaust pipe 112. Optional exhaust treatment 180 may contain but is not limited to, an optional oxidation catalyst, an optional exhaust filter, and an optional selective catalytic reduction reactor (SCR). Optional exhaust treatments 180 typically have a disadvantage of a relatively low reduction efficiency (e.g., 70% to 90%), which has the disadvantage that significant pollution is released to the atmosphere. $SO_x$ scrubbers and $CO_2$ scrubbers are not used on individual backup gensets, because it would not be cost-effective. Thus, a disadvantage of gensets without optional exhaust treatments 180, and even gensets with optional exhaust treatments 180 is that unnecessary PM, $NO_x$, $SO_x$, and $CO_2$ pollution is released into the atmosphere.

Figure 3:
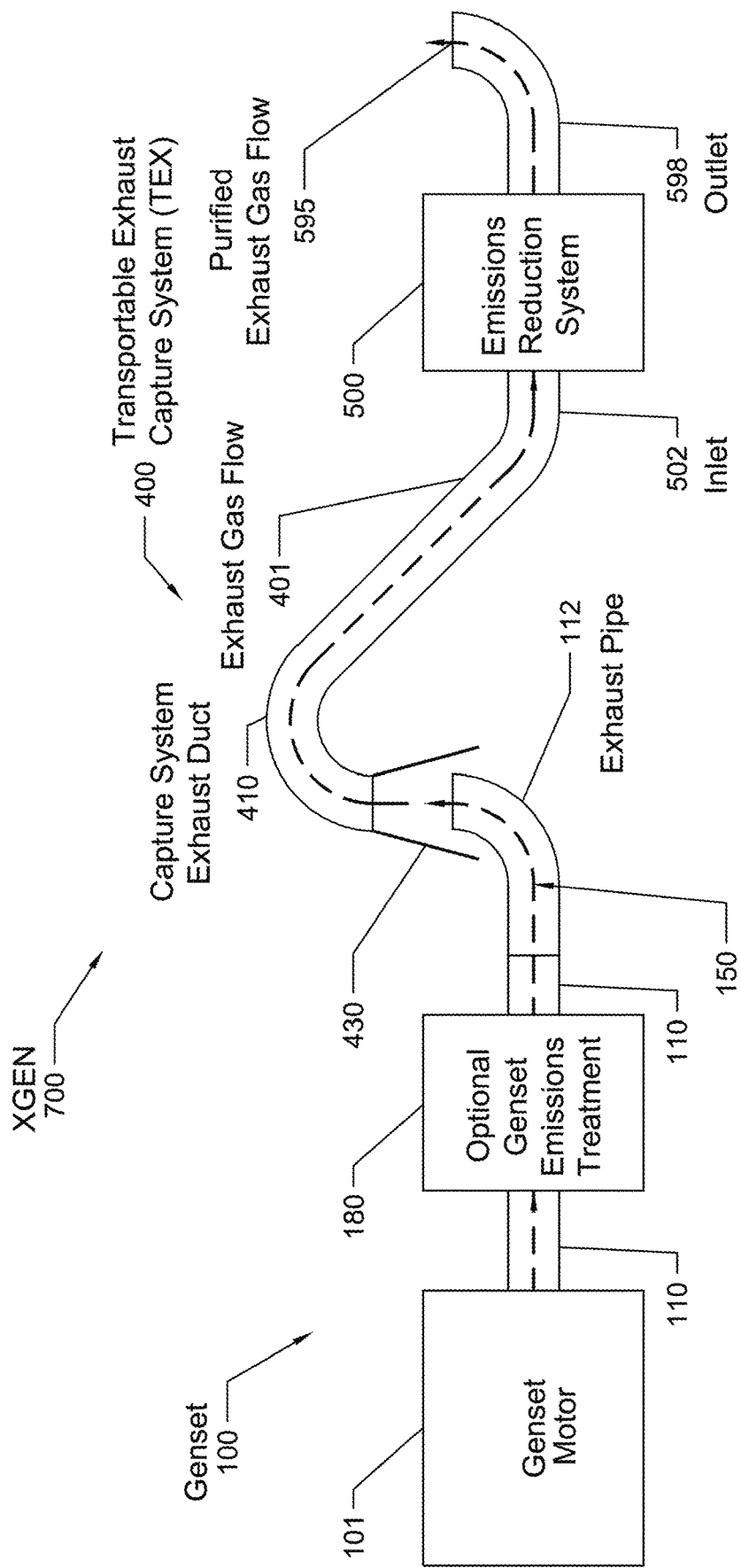
FIG. 3 is a block diagram showing an exemplary embodiment of a TRANSportable GENset emissions reduction system (XGEN) 700 connected to a typical genset 100 with optional genset emissions treatment 180.

FIG. 3 shows a block diagram of an exemplary embodiment of a transportable genset emissions reduction system (XGEN) 700 consisting of transportable exhaust capture system (TEX) 400 and emissions reduction system 500 connected to a typical genset 100 with optional genset emissions treatment 180. TEX 400 is shown connected to exhaust pipe 112 of genset 100 with connector 430. An exemplary embodiment of connector 430 may be an inverted funnel. An alternative exemplary embodiment of connector 430 is to slip flexible duct over the exhaust pipe. An optional modification to an exemplary embodiment of connector 430 is to include a means to prevent exhaust pipe 112 from extending too far into connector 430. Another optional modification to an exemplary embodiment of connector 430 is to include a means to seal the space between exhaust pipe 112 and connector 430. Exhaust gas 150 is shown contained by exhaust duct 110. Exhaust gas flow 401 is shown contained by capture system exhaust duct 410. Capture system exhaust gas duct 410 connects to emissions reduction system 500 via emissions reduction system inlet 502. Emissions reduction system outlet 598 provides an exit path for purified exhaust gas flow 402 to the atmosphere.

Figure 4:
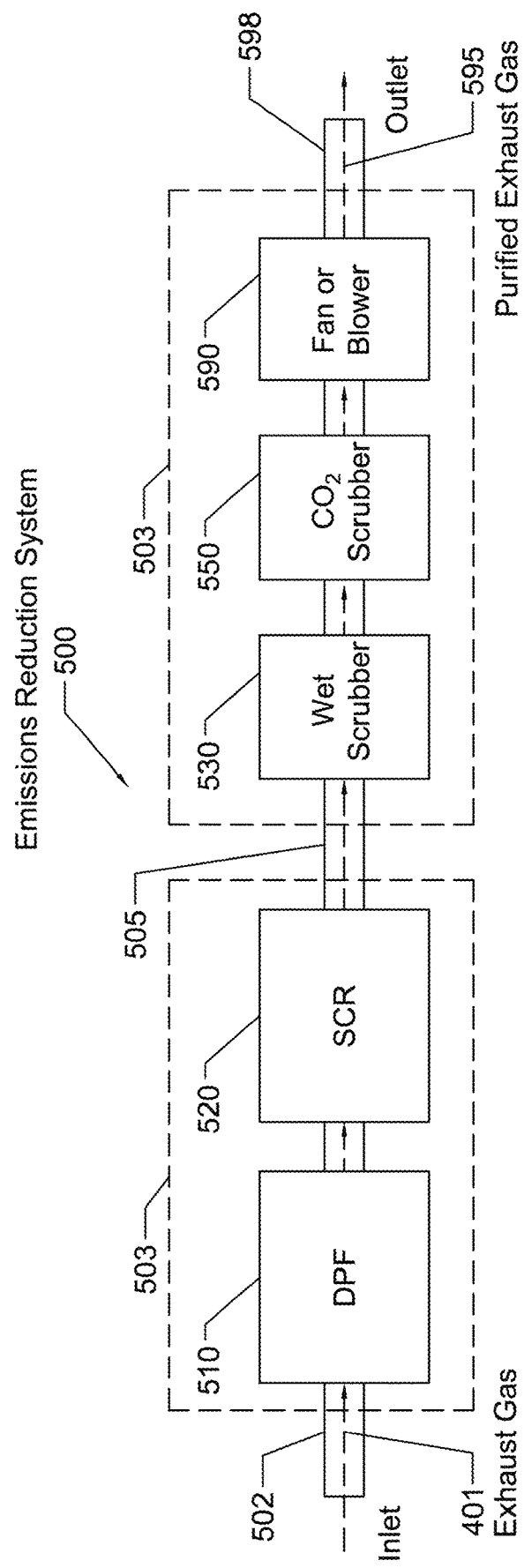
FIG. 4 is a block diagram of an exemplary embodiment of an emissions reduction system 500.

FIG. 4 shows a block diagram of stages of an exemplary embodiment of emissions reduction system 500, which contains an inlet 502 and an outlet 598. Emissions reduction system inlet 502 provides an entrance for exhaust gas 401. Emissions reduction system outlet 598 provides an exit for purified exhaust gas 595. An exemplary embodiment comprises at least one of a diesel particulate filter (DPF) 510, a selective catalytic reduction (SCR) 520, a wet scrubber 530, $CO_2$ scrubber 550, and a fan/blower 590. The location of fan/blower 590 may be located anywhere along the gas path, including optionally in the upstream container 503. The components of an exemplary embodiment are housed in at least one exhaust treatment container 503. If a plurality of containers 503 are required, then they are connected by interconnecting duct 505. More or fewer containers 503 may be required depending on the amount of equipment that must be housed in containers 503.

One skilled in the art would be able to design and implement emissions reduction system 500 using the devices listed above. Emissions reduction system 500 is typically designed to meet the specific requirements of the specific application. Thus, emissions reduction system 500 may vary to include additional stages than shown for removing additional pollutants or fewer stages than shown if requirements are not as stringent. Various numbers of stages, functions of the stages, orders of the stages, or pollutant reduction process in any or all of the stages may be utilized to construct an emissions reduction system 500. The stages shown in this block diagram can be arranged in an alternate order, and each of the stages may reside in any exhaust treatment container 503, and the quantity of exhaust treatment containers 503 may be more or less than shown in FIG. 4.

Exemplar DPF 510 may include, but are not limited to, ceramic honeycomb, catalyst-embedded ceramic filters, sorbent systems, thermal oxidizers, ceramic or metal candle filters, electrostatic precipitators, woven metal or ceramic media, ceramic foams, metal sintered filters, metallic foams, fiber wound filters, fiber knit filters, fiber woven filters, bound ceramic fibers, filter paper, filter felts, filter fleece, carbon filters, HEPA filters, vacuum filters, wall-flow filters and/or partial-flow filters.

Regeneration of exemplar DPF 510 may include, but are not limited to, passive regeneration, active regeneration, active regeneration using an electrical current through metal media, active regeneration with electric heat, active regeneration with fuel injection combined with an oxidation catalyst, and passive regeneration using $NO_2$ developed from an oxidation catalyst. Exemplary DPF 510 may include, but are not limited to; a means to back-flush the filter elements such as reverse gas pulse. Exemplar DPF 510 may include but are not limited to dry sorbent system (e.g., sodium bicarbonate, trona, or lime).

Exemplar SCR 520 may include, but are not limited to, catalyst-embedded ceramic filter, wet scrubber, thermal or plasma enhanced catalytic or non-catalytic $NO_x$ removal or $NO_x$ conversion systems, $NO_x$ Adsorber Catalysts (NAC), Passive $NO_x$ Adsorbers (PNA), and other technologies to reduce $NO_x$ adsorb $NO_x$, or convert $NO_x$ into more benign compounds. Reagents for SCR 520 may include but are not limited to urea, anhydrous ammonia, or aqueous ammonia (e.g., 19% aqueous ammonia). Catalysts for SCR 520 may include, but are not limited to, Vanadium-Titanium (e.g., BASF VNX™ or zeolite ETZ™), Titania (e.g., Cormetech), Vanadium (e.g., Haldor Topsoe), Zeolite, Copper-Zeolite-based, Iron-Zeolite-based, and Titania-supported Vanadia (e.g., Johnson Matthey SINOx or DeNOx). The catalyst may be heated or not. SCR 520 may or may not also include an Ammonia Slip Catalyst (ASC) to prevent excessive ammonia slip.

Exemplar wet scrubber 530 is any packed bed scrubber known in the art, including any packing material known in the art, that provides sufficient gas/liquid contact between the exhaust gas and the absorbing solution. In some embodiments, high efficiency packing with the low pressure drop across the packing may be used to minimize the size and operating costs of the packed bed. The nozzles of exemplary wet scrubber 530 may also be any type of nozzle or any other equipment capable of distributing an absorbing solution over the packed bed. Alternative wet scrubber 530 may include, but are not limited to, vertical scrubbers, horizontal scrubbers, staged scrubbers, packed-bed scrubbers, ionized wet scrubbers (IWS), and quenchers. Materials for wet scrubber 530 may include but are not limited to, plastic, composite, and metal. Reagents for wet scrubber 530 may include but are not limited to, calcium, sodium, magnesium, or potassium-based alkaline reagents.

Exemplar $CO_2$ Scrubber 550 is any packed bed scrubber known in the art, including any packing material known in the art, that provides sufficient gas/liquid contact between the exhaust gas and the absorbing solution. In some embodiments, high efficiency packing with the low-pressure drop across the packing may be used to minimize the size and operating costs of the packed bed. The nozzles of exemplary $CO_2$ scrubber 550 may also be any type of nozzle or any other equipment capable of distributing an absorbing solution over the packed bed. Alternative exemplary $CO_2$ scrubber 550 may include but are not limited to, vertical scrubbers, horizontal scrubbers, staged-scrubbers, packed-bed scrubbers, ionized wet scrubbers (IWS), $CO_2$ absorbers, and quenchers. Optional exemplary $CO_2$ scrubber 550 absorbs carbon dioxide ($CO_2$) from an exhaust stream using an absorbing solution, regenerates an alkaline component used in the absorbing solution, and produces the captured $CO_2$ as a salable gas or as a salable mineral. Reagents for exemplary $CO_2$ scrubber 550 may include but are not limited to, calcium, sodium, magnesium, or potassium-based alkaline reagents. Any mist eliminator design known in the art may also be added downstream of exemplary $CO_2$ scrubber 550 as required. $CO_2$ scrubber 550 may also use a membrane or ceramic interface between the reagent and the exhaust gas.

Exemplary fan or blower 590 may include, but are not limited to, fans, blowers, multiple inline fans, multiple inline blowers (for increased pressure), centrifugal blowers, forward curved fans, backward curved fans, high-pressure fans, radial blade fans, plenum fans, axial fans, axial propeller fans, backward-inclined fans/blowers, induced draft (ID) fans, forced draft (FD) fans, and/or compressors known in the art. Fan or blower 590 must be sized appropriately to overcome the pressure drop through transportable exhaust capture system 400 and emissions reduction system 500 at the highest design flow rate and highest design exhaust gas temperature.

Figure 5:
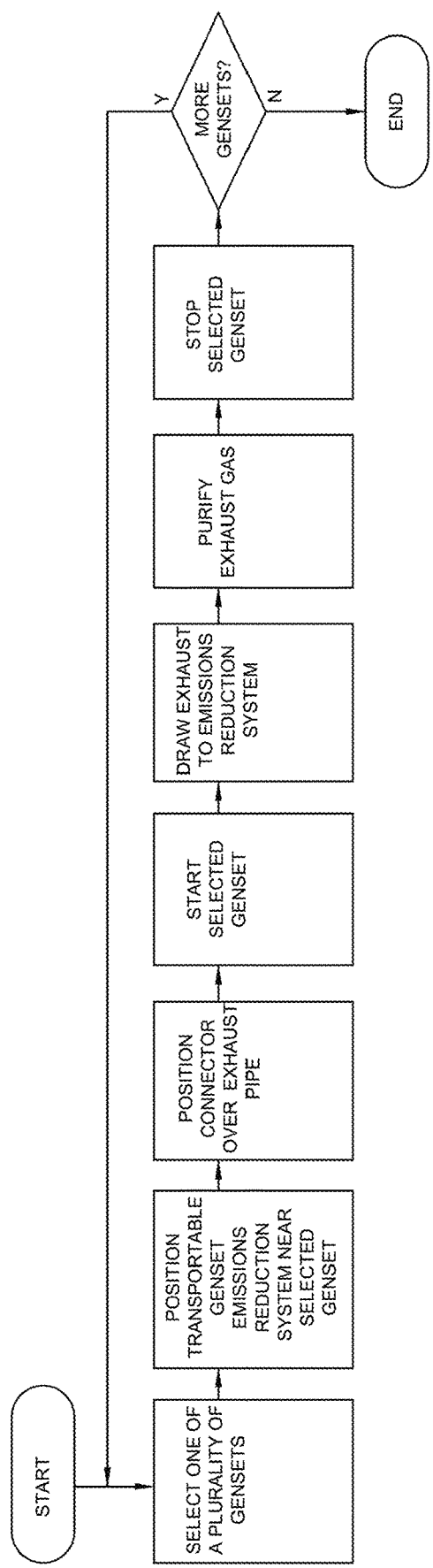
FIG. 5 shows a method of periodically testing a plurality of gensets one at a time using a transportable genset emissions reduction system (XGEN) 700.

FIG. 5 shows a method of periodically testing a plurality of gensets one at a time using a transportable genset emissions reduction system (XGEN) 700, whereby the emissions of each tested genset is reduced, thereby significantly reducing emissions from the plurality of gensets overall with the single, highly-efficient capital expenditure.

REFERENCE NUMERALS

100 genset
101 genset motor
110 exhaust duct
112 genset exhaust pipe
150 exhaust gas
180 optional genset exhaust treatment
182 optional genset oxidation catalyst
184 optional genset exhaust filter
186 optional genset SCR
300 transport system
310 truck/tractor
320 chassis
400 transportable exhaust capture system (TEX)
401 exhaust gas flow
410 capture system exhaust duct
430 connector
450 positioning apparatus
500 emissions reduction system
501 exhaust gas flow
502 emissions reduction system inlet
503 exhaust treatment container
505 interconnecting duct
510 diesel particulate filter (DPF)
520 selective catalytic reduction reactor (SCR)
530 wet scrubber
550 $CO_2$ scrubber
590 fan or blower
595 purified exhaust gas flow
598 emissions reduction system outlet
700 transportable genset emissions reduction system (XGEN)

Operation

FIG. 1 shows a perspective view of an exemplary embodiment of XGEN 700 connected to a typical genset 100. Transport system 300, comprising truck 310 and chassis 320 allow XGEN 700 to be transportable. Each container 503 is mounted on rolling chassis 320. If multiple chassis 320 are needed, then each chassis 320 is connected to form a train of chassis 320. The train of chassis 320 is pulled by truck/tractor 310. Truck/tractor 310 may also serve as the power source for XGEN 700. An advantage of an exemplary embodiment XGEN 700 is that it may be easily transported from genset to genset, using public roads without unusual permitting or extraordinary means. Containers 503 are connected together with flexible interconnecting duct 505 as a conduit for the exhaust gas. Containers 503 are also connected together with flexible utility cables, comprising electrical utilities, fluid utilities, and signal cables. An exemplary embodiment of a transportable exhaust capture system (TEX) 400 comprises positioning apparatus 450, which is also transportable, as an example, a driving crane fitted with exhaust ducting 410. TEX 400 is typically transported separately from emissions reduction system 500 and these two systems are connected at the job site once they are in position.

Backup gensets 100 are typically tested every few weeks. During this testing, the gensets produce a cloud of black smoke that annoys residents living nearby and possibly violates local visible air pollution rules. The operator of genset 100 schedules an XGEN 700 to be connected before the test startup to genset 100 to prevent this black cloud of smoke. Once XGEN 700 is positioned next to genset 100 and connected, then genset 100 is started. The XGEN 700 processes and purifies the emissions, eliminates the startup smoke cloud and reduces noise. Smokeless, purified exhaust gas leaves emissions reduction system outlet 598. Once the test is complete and genset 100 is shut down; the XGEN 700 is moved to the next scheduled genset 100, repeating the cycle.

FIG. 2 shows a typical genset motor 101 that produces harmful exhaust gas 150 that contains harmful emissions such as particulate matter (PM), oxides of nitrogen ($NO_x$), oxides of sulfur ($SO_x$), and the greenhouse gas carbon dioxide ($CO_2$).

If optional emissions treatment system 180 is installed, then the amount of harmful emissions is reduced to some extent. If included within emissions treatment system 180, an oxidation catalyst is typically used to increase the amount of $NO_2$ by oxidizing NO to $NO_2$. $NO_2$ is useful to help passively regenerate exhaust filter 184 since regeneration can occur at a lower temperature using $NO_2$ instead of $O_2$. Optional exhaust filter 184 is typically a diesel particulate filter (DPF) and is used to reduce the amount particulate matter (PM) in exhaust gas 150. Optional selective catalytic reduction reactor (SCR) 186 is used to reduce $NO_x$ in the exhaust gas. An apparatus to remove $SO_x$ and $CO_2$ is typically not installed as part of an optional emissions treatment system 180. Even if an optional emissions treatment system 180 is installed, there is typically a significant amount of PM, $NO_x$, $SO_2$, and $CO_2$ is not treated, because a highly-efficient treatment system would be too expensive for a system that only serves a single genset. However, since the capital expenditure of XGEN 700 can be shared by many gensets, then a highly-efficient treatment system is economically feasible, thereby providing the advantage of reducing nearly all the remaining PM, $NO_x$, $SO_x$, and most of the $CO_2$ that is missed by optional emissions treatment system 180.

An advantage of XGEN 700 is that it can easily be transported from genset to genset during periodic scheduled backup genset testing. FIG. 3 shows XGEN 700 connected to a typical genset 100 with optional genset emissions treatment 180. Connector 430 is positioned over exhaust pipe 112 to collect exhaust gas 150. Exhaust pipe 112 is typically oriented vertically with the outlet significantly above the ground to sufficiently disperse the exhaust gas, thereby reducing hazardous concentrations of exhaust gas in the breathing space near ground level. This vertical orientation makes it easy to form a connector 430 (e.g., an inverted funnel), that is lowered over exhaust pipe 112 by means of a supporting apparatus such as a crane or a mechanical arm. Transportable exhaust capture system (TEX) 400 comprises the supporting apparatus, connector 430, and capture system exhaust duct 410. The downstream aspect of exhaust duct 410 is a flexible duct that can be easily connected to emissions reduction system inlet 502. Once connector 430 is within reach of exhaust pipe 112 and the flexible outlet of capture system exhaust duct 410 is sufficiently close to inlet 502 of emissions reduction system 500, TEX 400 and emissions reduction system 500 are connected, enabling operation of XGEN 700. Next, XGEN 700 is started with fan/blower 590 is set to a sufficient speed to draw a sufficient amount of exhaust gas 150 into connector 430. Next, connector 430 is lowered sufficiently over exhaust pipe 112 to maximize the capture of emissions. Exhaust gas 150 is collected by connector 430, transmitted through TEX 400 into emissions reduction system 500 to produce a purified exhaust gas flow 595. Purified exhaust gas flow 595 exits emissions reduction system 500 via outlet 598 to the atmosphere.

During a typical work shift, XGEN 700 is connected to multiple gensets, scheduled one after the other. A periodic test of a genset 100 typically lasts thirty minutes to two hours. An advantage of XGEN 700 is that it remains at operating temperature between tests and does not require a warmup between each test. Thus, XGEN 700 has the advantage of controlling emissions immediately once genset 100 starts, even when optional genset emissions treatment 180 is not sufficiently warm to reduce a sufficient amount of $NO_x$. Thus, XGEN 700 has an advantage of reducing emissions that would otherwise be released into the atmosphere during a cold start of genset 100.

FIG. 4 is a block diagram showing an exemplary embodiment of emissions reduction system 500 comprising five stages as follows: a diesel particulate filter (DPF) 510, selective catalytic reduction (SCR) 520, wet scrubber 530, $CO_2$ scrubber 550, and fan/blower 590.

Diesel particulate filter (DPF) 510 is used to remove particulate matter (PM) from exhaust gas 401. Selective catalytic reduction reactor (SCR) 520 is used to remove $NO_x$ from exhaust gas 401. Wet scrubber 530 is used to remove $SO_x$ from exhaust gas 401. $CO_2$ scrubber 550 is used to remove carbon dioxide ($CO_2$) from exhaust gas 401.

Fan or blower 590 pulls exhaust gas 401 through transportable exhaust capture system (TEX) 400 and emissions reduction system 500. Fan or blower 590 is operated to provide zero or slightly negative back pressure on the connected genset to prevent the escape of a partial stream of exhaust gas 401.

In an exemplary embodiment, the major components of emission treatment system 500 are installed into containers 503. In FIG. 4, two containers 503 are shown. However, the number of containers 503 varies depending on the size and number of the major components used. When there is more than one container 503, then interconnecting duct 505 is used to transmit the exhaust gas from one container 503 to the next. Interconnecting duct 505 is typically a flexible duct to allow relative motion between containers 503.

Purified exhaust gas 595 exits emissions reduction system 500 through outlet 598. Purified exhaust gas 595 will typically contain very low concentrations of PM, $NO_x$, and $SO_x$ and a reduced amount of $CO_2$.

A disadvantage of repeated routine cold test starting of diesel gensets is that diesel particulate filters (DPF's) tend to clog with organic particulate matter because the duration within the regeneration temperature range is insufficient. For this reason, gensets with DPF's installed must run a minimum of 30 minutes to two hours to allow the genset to warm up completely and give the DPF sufficient time to regenerate. A disadvantage of this extended runtime is that it increases the amount of runtime needed for routine testing of these gensets, resulting in more greenhouse gas production and increased cost due to wasted fuel and increased time spent during routine periodic testing. An advantage of XGEN 700 is that the temperature of DPF 510 remains sufficiently high between consecutive startups of gensets 100, thereby allowing DPF 510 to regenerate sufficiently and thereby significantly reducing the risk of DPF clogging. Thus, in the case where gensets 100 do not contain optional genset emissions treatment 180, these gensets are not required to run a full 30 minutes to 2 hours because they contain no DPF, thereby having an advantage of reduced cost, (when used in conjunction with XGEN 700), resulting in reduced capital expenditure, reduced maintenance cost, reduced test time, reduced fuel use, and reduced greenhouse gas production.

A further disadvantage of the repeated routine cold test starting of diesel gensets is that selective catalytic reaction reactors (SCR's) do not operate until sufficiently warmed up. Significantly increased $NO_x$ emissions during the warm-up period of genset 100 results from routine cold startup tests. An advantage of XGEN 700 is that the temperature of SCR 520 remains sufficiently high between consecutive routine test startups of gensets 100, thereby allowing SCR 520 to operate efficiently (reducing $NO_x$) throughout a startup of genset 100.

For gensets that include optional genset emissions treatment 180, the minimum runtime is approximately 30 minutes to two hours to fully test the function of optional SCR 186. A disadvantage of this extended runtime is that it increases the amount of runtime needed for routine testing of these gensets, resulting in more greenhouse gas production and increased cost due to wasted fuel and increased time spent during routine periodic testing. An advantage of XGEN 700 is that it can efficiently eliminate $NO_x$ during routine genset testing, even if genset 100 does not include optional genset emissions treatment 180. Thus, gensets 100 without optional genset emissions treatment 180 have an advantage of reduced cost, (when used in conjunction with XGEN 700), because of the reduced capital expenditure, reduced maintenance cost, reduced test time, reduced fuel use, and reduced greenhouse gas production. A further advantage of using XGEN 700 for older backup gensets that are not equipped with optional genset emissions treatment 180 is an extended useful life of these older backup gensets. When used with XGEN 700, these older backup gensets can be routinely tested without producing harmful emissions, thereby delaying the purchase of newer gensets with optional emissions treatment 180, thus delaying considerable capital expenditure while also reducing emissions.

A disadvantage of a typical optional genset emissions treatment 180 is that it does not include $SO_x$ reduction. Reduction of $SO_x$ is important because $SO_x$ is a cause of acid rain and $SO_x$ can be a precursor to particulate matter. The advantage of emissions reduction system 500 as shown in FIG. 4 is the use of wet scrubber 530, which makes $SO_x$ reduction cost-effective because a single capital expenditure for wet scrubber 530 is shared with a multitude of gensets 100.

A disadvantage of a typical optional genset emissions treatment 180 is that it does not include $CO_2$ reduction. Reduction of $CO_2$ is becoming increasingly important because it is a greenhouse gas that causes global warming. The advantage of emissions reduction system 500 as shown in FIG. 4 is that $CO_2$ scrubber 550 removes $CO_2$ from the exhaust stream that would otherwise be released into the atmosphere. This $CO_2$ reduction capability is made practical and cost-effective since a capital expenditure for a scrubber 550 can easily be justified for XGEN 700 because a single capital expenditure is shared with a multitude of gensets 100. A further advantage is that the removed $CO_2$ may be separated as a saleable gas or solid product, thereby providing revenue.

FIG. 5 illustrates a method to test a plurality of gensets using a single transportable genset emissions reduction system (XGEN) 700, whereby a significant amount of emissions is reduced from the plurality of gensets using a single, highly-efficient capital expenditure, thereby resulting in increased overall emissions reductions at a reduced cost.

First, a plurality of gensets, located near each other or within driving range of each other, (the group) may be serviced by a single transportable genset emissions reduction system (XGEN) 700. Each genset within the group is scheduled such that one genset may be operated at a time, with sufficient time allocated in between the testing of each genset, thereby allowing XGEN 700 to service each genset within the group one at a time.

When a genset 100 is selected to be tested, transportable exhaust capture system (TEX) 400 is positioned sufficiently near exhaust pipe 112 of genset 100, such that connector 430 is within reach of exhaust pipe 112. Transport system 300, on which emissions reduction system 500 is securely mounted, is moved sufficiently close to TEX 400, such that emissions reduction system 500 may be connected to TEX 400.

Then, once XGEN 700 is sufficiently near selected genset 100 as described above, and all interconnections are made, then connector 430 is positioned over exhaust pipe 112 of genset 100, and XGEN 700 is activated to accept exhaust from selected genset 100.

Then, the test is initiated for selected genset 100 is started, thereby producing exhaust gas 150.

Then, XGEN 700 draws the produced exhaust gas 150 to emissions reduction system 500.

Then, emissions reduction system 500 purifies exhaust gas 150 thereby reducing emissions from exhaust gas 150 producing a purified exhaust gas 595.

Then, once the test of selected genset 100 is complete, genset 100 is stopped.

Then, if there are more gensets to be tested, then the cycle repeats, beginning by moving XGEN 700 to the next-selected genset.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention that is seen in the above description and otherwise defined by the following claims.

CONCLUSIONS

Accordingly, several advantages of one or more aspects are as follows:
1. A method to test a plurality of gensets using a single transportable genset emissions reduction system (XGEN) 700, whereby a significant amount of emissions is reduced from the plurality of backup gensets using a single, highly-efficient capital expenditure, thereby resulting in increased overall emissions reductions at a reduced cost.
2. Given that power blackouts occur very infrequently, a TRANSportable GENset emissions reduction system (XGEN) 700 that fixes the larger and more significant problem of reducing emissions from routine periodic testing of backup gensets, rather than during a power blackout, whereas XGEN 700 may be scheduled to be shared by a multitude of gensets, thereby reducing costs through efficient use of capital expenditures while also increasing the quality of emissions reductions as compared to applying fixes to said multitude of backup gensets individually.
  a. A further advantage being that XGEN 700 may be transported from genset to genset via public roads, thereby enabling XGEN 700 to service a plurality of gensets within a large geographic area.
3. For older pre-existing backup gensets, which are tested periodically, and DO NOT have emissions controls installed, in which XGEN 700 may be scheduled to be used by said gensets during said periodic tests:
  a. XGEN 700 eliminates the large black cloud of smoke that would otherwise occur during a cold start, thereby reducing complaints from nearby neighborhoods.
  b. XGEN 700 extends the useful life of older gensets, eliminating the need to purchase new gensets with emissions controls, while significantly reducing overall emissions from said backup genset, thereby saving the capital cost to purchase a new genset or retrofit while also reducing PM, $NO_x$, $SO_x$, and $CO_2$ emissions.
  c. XGEN 700 reduces the periodic test time, if said gensets would otherwise have been retrofitted with DPF 184, said retrofit requiring that said genset/DPF run longer per test (up to two hours) to fully regenerate said DPF 184. XGEN 700 does not require a long regeneration time, therefore reducing test time/labor cost, fuel cost, while also reducing PM, $NO_x$, $SO_x$, and $CO_2$ emissions.
  d. XGEN 700 reduces motor exhaust noise during said periodic tests.
4. For older pre-existing backup gensets, which are tested periodically, and have emissions controls installed, in which XGEN 700 may be scheduled to be used by said gensets during said periodic tests:
  a. XGEN 700 removes PM that bypasses said emissions controls, whereas PM filters of said pre-existing emissions controls are not highly efficient.
  b. XGEN 700 removes $NO_x$ that bypasses said emissions controls, whereas $NO_x$ reduction of said pre-existing emissions controls is not effective during the predominant startup phase of periodic testing.
  c. XGEN 700 cost-effectively removes $SO_x$ emissions, whereas $SO_x$ is not reduced by said pre-existing emissions controls.
  d. XGEN 700 cost-effectively capture $CO_2$ emissions, whereas $CO_2$ is not reduced by said pre-existing emissions controls.
    i. Furthermore, said captured $CO_2$ emissions may be separated as a saleable gas or solid product, thereby providing revenue to compensate for part of the cost to reduce said $CO_2$ emissions.
  e. XGEN 700 reduces motor exhaust noise during said periodic tests.
5. An exemplary embodiment of TRANSportable GENset emissions reduction system (XGEN) 700 with a transport system 300 having an advantage of being compatible with road transportation, thereby allowing XGEN 700 to easily move from genset to genset on standard roads to allow XGEN 700 to be used on a multitude of gensets that may be scheduled to run at different times.
  a. The ability to periodically test a multitude of gensets using a pre-determined schedule provides the advantage of efficient use of capital expenditures, thereby significantly improving the cost-effectiveness of reducing overall pollution within a local geographic area that contains the multitude of gensets.
  b. Furthermore, an embodiment of XGEN 700 that conforms to universal transportation standards (e.g., shipping container format) having the advantage of fast and inexpensive shipment to any location in the world via container trucks, container trains, and container ships, thereby eliminating expensive and time-consuming modifications to a multitude of gensets 100.

Ramifications
1. In the case of mobile sources such as ships, significant emissions may be concentrated around a port where ships stay at berth for a period of time with auxiliary gensets running. These ships many times do not have emissions controls, and it would be too expensive to retrofit all the ships with individual emission control systems. An advantage of an XGEN 700 is ability to move from berth to berth within a terminal, and also to move from terminal to terminal via public roads and also to move from berth to berth within the same terminal via public roads, and also to move XGEN 700 onto a barge in order to service ships from the waterside of the ships, thereby reducing PM, $NO_x$, $SO_x$, and/or $CO_2$ emissions from ships that would have otherwise been released into the atmosphere and/or saving cost compared to additional non-transportable emissions reduction systems.
2. In the case of mobile sources such as locomotives, significant emissions may be concentrated around a railyard where locomotives stay idling for a period of time motor-generators running. These locomotives many times do not have emissions controls, and it would be too expensive to retrofit all the locomotives with individual emission control systems or replace the locomotives with cleaner locomotives. An advantage of an XGEN 700 is ability to move from locomotive to locomotive within a railyard, and also to move from railyard to railyard via public roads and also to move to different locomotives on the same railyard via public roads, thereby enabling an XGEN 700 to reduce emissions from locomotives that would otherwise release PM, $NO_x$, $SO_x$, and/or $CO_2$ into the atmosphere and/or save the cost of additional non-transportable emissions reduction systems.

I claim:
1. A transportable genset emissions reduction system comprising:
  a connector to temporarily couple to an exhaust pipe of a genset producing exhaust gas;
  at least two public-road compatible exhaust treatment containers for purifying said exhaust gas from said genset;
  at least two exhaust treatment systems contained within said respective at least two exhaust treatment containers and configured to purify said exhaust gas from said genset;
  a first of said at least two exhaust treatment containers comprising an inlet and a second of said at least two exhaust treatment containers comprising an outlet, the inlet connected to an input of a first of the at least two exhaust treatment systems, the outlet connected to an output of a second of the at least two exhaust treatment systems;
  at least two public-road compatible chassis configured to mount said at least two exhaust treatment containers respectively for transportation on public roads in a transport mode;

said at least two exhaust treatment containers mounted on said respective chassis and connected by at least one interconnecting duct;

an inlet duct configured to convey said exhaust gas from said connector to said inlet of said first exhaust treatment container;

a crane configured to support said connector and said inlet duct, the crane configured to position the connector in relation to said exhaust pipe of said genset;

the at least two exhaust treatment systems configured to treat said exhaust gas in an operating mode to reduce selected pollutants from said exhaust gas.

2. The transportable genset emissions reduction system of claim 1, wherein said crane is selected from the group consisting of a driving crane, a mobile articulating crane, a combination of articulating and telescopic mobile crane, and a converted mobile concrete pumping crane.

3. The transportable genset emissions reduction system of claim 1, whereas said transportable genset emissions reduction system is configured for sequential operation with a plurality of gensets.

4. The transportable genset emissions reduction system of claim 1, whereas said exhaust treatment system further comprises a diesel particulate filter configured to reduce the mass flow rate of particulate matter from said exhaust gas.

5. The transportable genset emissions reduction system of claim 4, whereas the diesel particulate filter is configured to be regenerated and the regeneration of said diesel particulate filter is selected from the group containing consisting of passive regeneration, passive regeneration using nitrogen dioxide, active regeneration, active regeneration using an electrical current through metal media, and active regeneration with electric heat.

6. The transportable genset emissions reduction system of claim 4, whereas said diesel particulate filter is selected from the group containing consisting of ceramic honeycomb, a thermal oxidizers, electrostatic precipitators, a woven metal filters, ceramic media, ceramic foams, metal sintered filters, metallic foams, fiber wound filters, fiber knit filters, fiber woven filters, bound ceramic fibers, filter paper, filter felts, filter fleece, carbon filters, HEPA filters, vacuum filters, wall-flow filters, and partial-flow filters.

7. The transportable genset emissions reduction system of claim 1, whereas said exhaust treatment system further comprises a selective catalytic reduction (SCR) system configured to reduce the mass flow rate of oxides of nitrogen from said exhaust gas.

8. The transportable genset emissions reduction system of claim 7, further comprising a reagent and a catalyst, said reagent is selected from the group containing consisting of urea and anhydrous ammonia, said catalyst is selected from the group containing consisting of Vanadium-Titanium, Titania, Vanadium, Zeolite, Copper-Zeolite-based, Iron-Zeolite-based, and Titania-supported Vanadia.

9. The transportable genset emissions reduction system of claim 1, whereas said second exhaust treatment container is configured to reduce the mass flow rate of oxides of sulfur from said exhaust gas.

10. The transportable genset emissions reduction system of claim 1, whereas said second exhaust treatment system is configured to reduce the mass flow rate of carbon dioxide from said exhaust gas.

11. The system of claim 10, whereas said second exhaust treatment system is configured to separate said carbon dioxide as a gas product or a solid product.

12. The transportable genset emissions reduction system of claim 1, whereas said transportable genset emissions reduction system is configured to reduce noise from said genset.

13. The transportable genset emissions reduction system of claim 1, wherein a truck/tractor serves as a power source for said transportable genset emissions reduction system.

14. A method for reducing emissions from a plurality of gensets using the transportable genset emissions reduction system of claim 1, the method comprising:
(i) coupling the connector to an exhaust pipe of a first of the plurality of gensets to capture an exhaust gas using a crane;
(ii) drawing said exhaust gas through the inlet duct to the first exhaust treatment container;
(iii) purifying said exhaust gas with the at least two exhaust treatment systems housed within the at least two containers, respectively, to reduce selected pollutants;
(iv) transporting the connector, the inlet duct and the at least two exhaust treatment containers with the at least two exhaust treatment systems over public roads to another of the plurality of gensets;
(v) repeating steps (i) through (iv) to sequentially conduct emission treatment operation on other gensets of the plurality of gensets.

15. A method for reducing emissions from a plurality of land-based gensets, the method comprising:
(i) coupling a connector to an exhaust pipe of a first of the plurality of land-based gensets to capture an exhaust gas using a crane;
(ii) drawing said exhaust gas through a duct to at least one exhaust treatment container;
(iii) purifying said exhaust gas with an exhaust treatment system housed within the at least one container to reduce selected pollutants;
(iv) transporting the connector, the duct and the at least one exhaust treatment container with the exhaust treatment system over public roads to another of the plurality of land-based gensets;
(v) repeating steps (i) through (iv) to sequentially conduct emission treatment operation on other gensets of the plurality of land-based gensets.

\* \* \* \* \*